Patented Aug. 18, 1931

1,819,462

UNITED STATES PATENT OFFICE

HAROLD GROSSMAN, OF CALDWELL, NEW JERSEY, ASSIGNOR OF ONE-FOURTH TO WILLIAM S. PRITCHARD, OF NEW YORK, N. Y.

METHOD OF ACCELERATING THE SETTLEMENT OF PIGMENTS

No Drawing. Application filed February 24, 1927. Serial No. 170,742.

This invention relates to a novel and improved method for accelerating the settling of solids which are held in suspension in a liquid. While the method is capable of being used with a wide variety of substances, it finds particular utility in connection with the manufacture of pigments and will accordingly be described in that connection.

In manufacturing a pigment and more especially one of the iron blues, such as Prussian blue or Paris blue, the pigment has to be repeatedly washed to remove acids, soluble salts and other foreign matter. The washing is usually done in water, which forms an aqueous solution of the whole, the pigment and the foreign matter as well. The foreign matter is ultimately removed by the washing but the remaining pigment is so finely subdivided that it requires an extremely long time to settle. It is not at all unusual to spend days and weeks in the washing and settling, and a very large proportion of this time is consumed in settling. The washing takes a comparatively short time. The long time taken by the settling ties up the apparatus, such as tanks and other equipment, and consequently adds enormously to the expense of the operation.

Therefore it is the object of my invention to hasten the settling of the pigment and this I accomplish by the method which I shall now describe.

According to my invention I add to the solution in which the pigment is suspended a substance which is capable of coagulating the pigment, this substance being in colloidal solution. I then add to the suspension a medium which will cause coagulation of the substance in colloidal solution and thus coagulation of the pigment.

The first substance is preferably a protein which may be dissolved in a suitable solvent to form a colloidal solution. This protein solvent should be of a kind to neutralize the solution in which the pigment is suspended. If the pigment is suspended in an acid solution, then the solvent of the protein should be basic, while, if the suspension is basic, then the solvent for the protein should be acid. If the solution in which the pigment is suspended is neutral, then it should be rendered slightly acid or basic before or after the protein in its solvent is added thereto. The neutralizing which will follow when the protein solution is added to the solution containing the pigment will render the protein insoluble, and then a coagulating medium such as a suitable salt or acid may be added to the suspension to cause coagulation of the protein, which also will cause coagulation of the pigment and consequently rapid settling thereof. The protein may be precipitated with the pigment but its presence therein is harmless, particularly because the quantity is negligible. Other substances, such as gelatines which are not rendered insoluble by neutralizing, may be used which will not be precipitated but will remain in solution after coagulation and may be washed out with the other foreign matter. After precipitation the pigment may be filter-pressed and dried in the usual way.

The probably correct theory is the following. The protein solution is colloidal and is one having a very large specific surface. When this solution is added to the aqueous solution in which the pigment is suspended, the pigment will become coated with an extremely thin layer of the protein, the thickness probably being mono-molecular. When in this condition the protein has a very low surface tension but when the salt or acid is added the surface tension of the protein solution will increase, very greatly decreasing the specific surface. The solution which coats the pigment particles will, when the surface tension is increased, carry down these particles. The above theory is based upon the generally accepted theory of coagulation, but of course I do not limit my invention by this or any other theory.

The protein which I prefer to use is casein which may be dissolved in sodium secondary phosphate or in a solution of sodium hydroxide or ammonium hydroxide. The solvent which is preferred is sodium secondary phosphate, this or other neutral solvent being preferable for use when the pigment is one which is sensitive to an acid or a base, and one which would be decolorized or otherwise hurt thereby. Other suitable solvents are known to those skilled in the art.

The coagulating medium used to cause coagulation of the protein may be any suitable salt, acid or base. Examples of suitable media are aluminum sulphate, barium chloride, hydrochloric acid and sulphuric acid. Other suitable media will readily suggest themselves to those skilled in the art.

Another method of practising my invention is to dissolve dry aluminum acetate in water to form colloidal aluminum hydroxide and acetic acid. The aluminum hydroxide forms the coagulating medium which will cause coagulation of the pigment upon warming the hydroxide. This is an example of media formed by hydrolyzing salts of metals.

Another way of expressing the above methods is to say that I add to the pigment solution a sol which preferably is a protein in colloidal solution and then I convert the sol into a gel, the gel being the precipitated sol.

The gist of my invention resides in coagulating the protein or other substance which I may employ in place thereof. This may be done as described above by neutralizing the substance. A certain amount of acid, base or salt may already be present in the pigment vat to which the protein is added and these may be in excess of what is necessary to neutralize the protein. If that is the case then the substances may conveniently be used to act as coagulating media. The suspension itself need not be completely neutralized during the operation, any excess of acid, base or salt being washed off in the usual manner.

While I have described certain methods which I have found to be satisfactory, nevertheless it is to be understood that these methods are given merely as illustrations and I do not intend to limit myself thereby. Other equivalent methods will readily suggest themselves to those skilled in the art and I therefore intend to limit myself only by the appended claim.

I claim:

A method of accelerating the settling of a pigment in suspension in an aqueous liquid which comprises adding to the suspension aluminum acetate whereby aluminum hydroxide is formed and coagulating said hydroxide, whereby said pigment is coagulated.

In testimony whereof, I have affixed my signature to this specification.

HAROLD GROSSMAN.